(12) United States Patent
Ninomiya et al.

(10) Patent No.: US 7,492,812 B2
(45) Date of Patent: Feb. 17, 2009

(54) RFID TRANSCEIVER DEVICE

(75) Inventors: Teruhisa Ninomiya, Kawasaki (JP); Yusuke Kawasaki, Inagi (JP); Osamu Kuroda, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 555 days.

(21) Appl. No.: 11/209,627

(22) Filed: Aug. 24, 2005

(65) Prior Publication Data

US 2006/0229032 A1  Oct. 12, 2006

(30) Foreign Application Priority Data

Apr. 8, 2005  (JP) .............................. 2005-111531

(51) Int. Cl.
*H04L 5/16* (2006.01)

(52) U.S. Cl. ...................................... 375/219

(58) Field of Classification Search ................. 375/219, 375/222
See application file for complete search history.

(56) References Cited

U.S. PATENT DOCUMENTS 6,229,992 B1 * 5/2001 McGeehan et al. ............. 455/78
6,686,830 B1   2/2004 Schirtzer ................... 340/10.2
7,330,500 B2 * 2/2008 Kouki ......................... 375/219
2002/0072344 A1 * 6/2002 Souissi ....................... 455/296

FOREIGN PATENT DOCUMENTS

| EP | 1-1710-727 A1 | * | 7/2006 |
| GB | 2-300-318 | * | 10/1996 |
| JP | 2003-174388 | | 6/2003 |

* cited by examiner

*Primary Examiner*—Tesfaldet Bocure
(74) *Attorney, Agent, or Firm*—Hanify & King, P.C.

(57) ABSTRACT

An RFID transceiver device is capable of high sensitivity reception, by the reduction of noise, irrespective of the distance to the tag. The RFID transceiver device includes a delay circuit between a local oscillation circuit and a demodulation circuit, wherein the amount of delay of the delay circuit is set to a magnitude corresponding to the path difference between the path of leakage, via a duplexer into the demodulation circuit, of transmission signal output from the local oscillation circuit for transmission, and the path of direct input of the local oscillation signal from the local oscillation circuit to the demodulation circuit.

5 Claims, 14 Drawing Sheets

FIG. 1
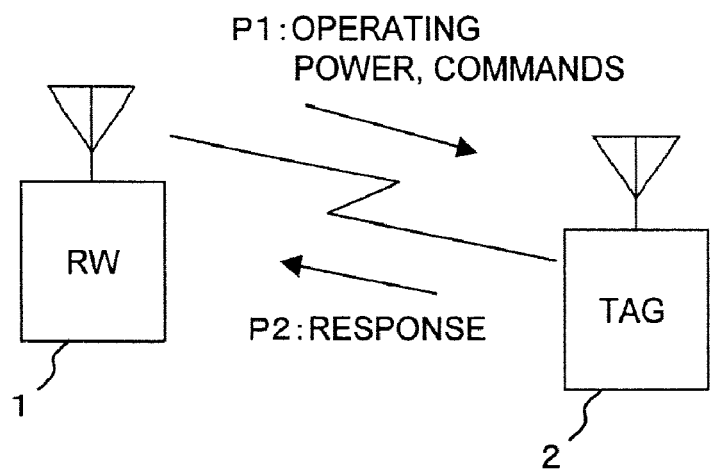
P1: OPERATING POWER, COMMANDS
P2: RESPONSE
RELATED ART  FIG. 2
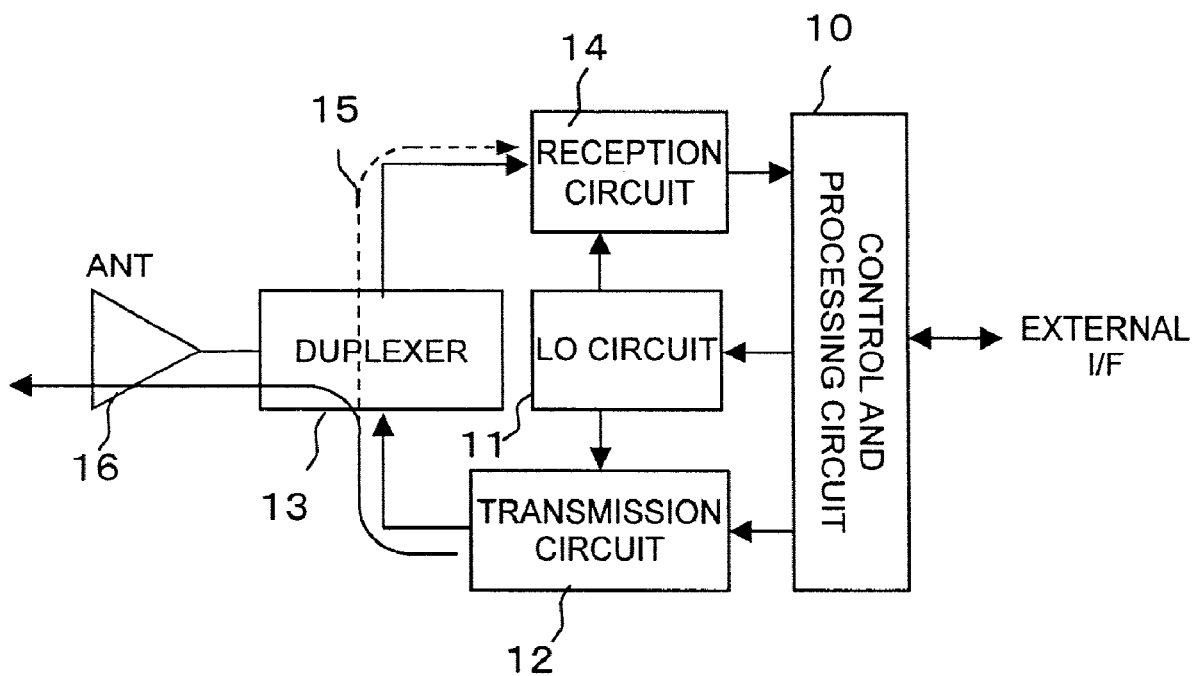

A: RECEPTION LO SIGNAL

B: TRANSMISSION SIGNAL LEAKAGE

RFID TRANSCEIVER DEVICE

CROSS-REFERENCE TO RELATED APPLICATIONS

This application is based upon and claims the benefit of priority from the prior Japanese Patent Application No. 2005-111531, Filed on Apr. 8, 2005, the entire contents of which are incorporated herein by reference.

BACKGROUND OF THE INVENTION

1. Field of the Invention

The present invention relates to an RFID transceiver device in an RFID system, and more particularly to an RFID transceiver device in which receiver noise is improved.

2. Description of the Related Art

As shown in FIG. 1, in an RFID system, a carrier signal is transmitted (P1) from an interrogator constituted by an RFID transceiver device 1 to a transponder for example an IC tag 2. The IC tag 2 modulates the received carrier signal with information data and sends this back to the RFID transceiver device 1 by reflection (back scattering). The RFID transceiver device 1 acquires information data by demodulating the reflected signal.

FIG. 2 shows an example of the configuration of an RFID transceiver device. This RFID transceiver device is connected to a data processing device, not shown, through an external interface I/F. A control and processing circuit 10 controls a local oscillation circuit 11 to generate a local oscillation signal corresponding to each channel.

The local oscillation signal that is generated from the local oscillation circuit 11 is modulated and amplified in power by a transmission circuit 12 before being emitted from an antenna 16 through a duplexer 13. The local oscillation signal is additionally supplied to a demodulation circuit in a reception circuit 14 and the demodulation circuit outputs information data by demodulating the reflected signal from the IC tag 2.

It is undesirable from the point of view of cost and size that separate antennas should be provided respectively for transmission and reception in FIG. 2, so a transceiving antenna 16 as shown in FIG. 2 may be employed for the RFID transceiver device 1.

Furthermore, since, in the case where the IC tag 2 is a passive tag, the operating power (power source energy) is obtained from the electromagnetic wave transmitted by the RFID transceiver device 1, the RFID transceiver device 1 needs to have large transmission power. In contrast, since the response transmission from the IC tag 2 is performed by reflection (back scattering), its power is very weak in comparison with the power of the electromagnetic wave transmitted by the RFID transceiver device. Thus, the RFID transceiver device 1 whose communications partner is a passive IC tag needs to have high output power in order to supply power source energy to the IC tag 2 and, at the same time, must be provided with a high sensitivity reception capability, since the back-scattered signal from the passive IC tag is very weak.

When a transceiving antenna 16 is employed, in order to isolate the transmission and reception signal, a duplexer (typically constituted by a circulator or coupler) 13 is provided; however, as mentioned above, the energy of the transmission signal is large, so leakage 15 of the transmission signal is generated, of a level that depends on the degree of isolation achieved by the duplexer 13. Also, as shown in FIG. 3, apart from the component 15a that passes through the duplexer with attenuation, the leakage components of the transmission signal include a component 15b that is reflected by the power feed terminal of the antenna 16. Also, as shown in FIG. 4, if the transmission and reception signal frequencies f1 and f2 are different, as they are in the case of for example a mobile telephone terminal, isolation of transmission and reception can be achieved by providing bandpass filters 12a, 14a as well as the duplexer 13. However, in the case of an RFID system, as shown in FIG. 3, the frequency of transmission (carrier signal) and reception (tag reflection signal) are the same, so isolation using filters is not possible. For the above reasons, phase noise of the carrier signal appears to be detected at the output of the demodulation circuit constituting the reception circuit 14. Also, due to the problem of saturation caused by the leakage of the transmission signal, low noise amplification cannot be performed upstream of the demodulation circuit.

The mechanism by which such phase noise is detected will further be described with reference to the drawings. FIG. 5 is an example of a specific configuration of the transmission circuit 12 and reception circuit 14 of the RFID transceiver device 1 shown in FIG. 2.

FIG. 6 is a view showing the input signal of the demodulation circuit 14b constituting the reception circuit 14. The input signals of the demodulation circuit 14b are the local oscillation signal 17 (FIG. 6A) from the local oscillation circuit 11 and the leakage component 15 (FIG. 6B) of the transmission signal including the component 15a that is transmitted, with attenuation, through the duplexer 13 and the reflected signal 15b from the antenna power feed terminal.

Consequently, assuming that the operation of the demodulation circuit 14b is multiplicative, when the higher order component is discarded, the output of the demodulation circuit 14b may be expressed by the expression (1).

$$\cos[\omega t + p[t]] \times \cos[\omega(t-\tau) + P[t-\tau]] \Rightarrow \frac{1}{2}\cos[\omega t + P[t] - P[t-\tau]] \quad (1)$$

The term that determines the magnitude of the phase noise component in the output of the demodulation circuit in expression (1) i.e.

$$P[t]-P[t-\tau]$$

is 0 when $\tau=0$. In contrast, it increases with increasing $\tau$ if the phase noise is time-correlated.

However, in the above expression, $$\cos[\omega t+P[t]]$$

is the local oscillation signal (FIG. 6A) from the local oscillation circuit 11, and $$\cos[\omega(t-\tau)+P[t-\tau]]$$

is the leakage 15 (FIG. 6B) of the transmission signal.

On the other hand, the phase noise component is expressed by $$P[t] = \int_0^\tau du \int_0^u h[u-v]g[y]dv$$

where $$g[t]$$

is the input noise of the VCO of the local oscillation circuit 11 and $$h[t]$$

is the frequency characteristics (loop filter characteristics) of the VCO input stage. Thus the phase noise component has a correlation with time.

From the above relationship, it can be seen that, if the paths to the output of the demodulation circuit 14b are respectively different for the local oscillation signal from the local oscillation circuit 11 and for the leakage 15 of the transmission signal, so that there is a time difference between the paths to the demodulation circuit as shown in FIG. 6, the correlation of the leakage 15 (FIG. 6B) of the transmission signal and the local oscillation signal (FIG. 6A) becomes smaller as the path time difference τ becomes larger: as a result, the noise component that is output from the demodulation circuit 14b also becomes larger. FIG. 7 is a graph showing the relationship between the path time difference and the noise level (relative value). From the graph of FIG. 7, it can be understood that the detected phase noise level becomes larger as the path time difference τ becomes larger and if there is no path time difference, the phase noise component is substantially cancelled out.

Laid-open Japanese Patent Application No. 2003-174388 may be mentioned as prior art. This Laid-open Japanese Patent Application No.2003-174388 mentions that the phase noise possessed by the carrier itself that is transmitted from the interrogator and the phase noise of the PLL oscillation circuit that is involved in synchronous detection appear in the demodulation signal and adversely affect reception sensitivity. The object of the invention set out in Laid-open Japanese Patent Application No. 2003-174388 referred to above is to prevent lowering of the reception sensitivity in synchronous detection by the interrogator.

However, the invention set out in Laid-open Japanese Patent Application No. 2003-174388 referred to above is an arrangement in which the phase of the local signal LO is corrected using the response signal from the tag as a reference. Such a configuration is effective in systems in which there is substantially no change in the amplitude/phase of the response signal and the leakage of the transmission signal i.e. systems in which the frequency is low, at about 13.56 MHz, and in which the distance to the transponder is small, at about 30 cm.

However, in the case where an RFID transceiver device and IC tag are employed with a distance of a few m in the UHF band (860 MHz to 960 MHz) or higher frequency bands, phase variations of 10 or more times 360° are experienced, depending on the distance.

SUMMARY OF THE INVENTION

An object of the present invention is therefore to provide an RFID transceiver device that makes possible noise reduction even under conditions in which the invention set out in Laid-open Japanese Patent Application No. 2003-174388 referred to above cannot be used, irrespective of the distance to the tag and which thus makes possible high sensitivity reception.

According to a first aspect, an RFID transceiver device whereby the above object of the present invention is achieved is characterized in that it comprises: a local oscillation circuit that generates a local oscillation signal; a demodulation circuit that demodulates a reception signal using the frequency of the local oscillation signal output from the local oscillation circuit; a transmission circuit that modulates and amplifies and transmits a local oscillation signal output from the local oscillation circuit; a duplexer that supplies to a transceiving antenna the transmission signal from the transmission circuit and that branches the reception signal received by the transceiving antenna to the demodulation circuit; and, in addition, a delay circuit between the local oscillation circuit and the demodulation circuit, the amount of delay of the delay circuit being set to a magnitude corresponding to the path difference between the path of the leakage through the duplexer into the demodulation circuit, of the transmission signal output from the local oscillation circuit for transmission and the path of the direct input from the local oscillation circuit to the demodulation circuit.

According to a second aspect, in the first aspect, an RFID transceiver device whereby the above object of the present invention is achieved, is characterized in that it further comprises a control and processing circuit that detects noise level in accordance with the output of the demodulation circuit and the control and processing circuit performs feedback control of the delay amount of the delay circuit in response to the noise level that is detected.

According to a third aspect, an RFID transceiver device whereby the above object of the present invention is achieved is characterized in that it comprises: a local oscillation circuit that generates a local oscillation signal; a demodulation circuit that demodulates a reception signal using the frequency of the local oscillation signal output from the local oscillation circuit; a modulation circuit that modulates the local oscillation signal that is output from the local oscillation circuit; a duplexer that supplies to a transceiving antenna the transmission signal output from the modulation circuit and that branches the reception signal received by the transceiving antenna to the demodulation circuit; and, in addition, the amount of delay on the path whereby the local oscillation signal that is output from the modulation circuit is supplied to the demodulation circuit being set identical to the amount of delay on the path of the leakage of the transmission signal that is input to the demodulation circuit through the duplexer.

According to a fourth aspect, an RFID transceiver device whereby the above object of the present invention is achieved is characterized in that, in any of the first to the third aspects, it further comprises a transceiving antenna and a delay circuit that connects the transceiving antenna and the duplexer, the amount of delay of this delay circuit being set such that the impedance of the transceiving antenna seen from the duplexer is substantially equal to the characteristic impedance.

According to a fifth aspect, an RFID transceiver device whereby the above object of the present invention is achieved is characterized in that, in the second aspect, detection of the noise level in the control and processing circuit is performed in a condition in which command transmission from the transmission circuit to the tag is halted.

According to the present invention, an RFID transceiver device is obtained wherein lowering of the noise level can be achieved irrespective of the distance to the tag and consequently high sensitivity reception can be achieved and wherein system stabilization can be achieved at a frequency in the UHF band or above.

Characteristic features of the present invention will become additionally apparent from the embodiments of the present invention described below with reference to the drawings.

BRIEF DESCRIPTION OF THE DRAWINGS

FIG. 1 is a view given in explanation of an RFID system;

FIG. 2 is a block diagram of an RFID transceiver device;

DESCRIPTION OF THE PREFERRED EMBODIMENTS

Embodiments of the present invention are described below with reference to the drawings. It should be noted that the embodiments are given to assist understanding of the present invention and the technical scope of the present invention is not restricted thereto.

Figure 8:
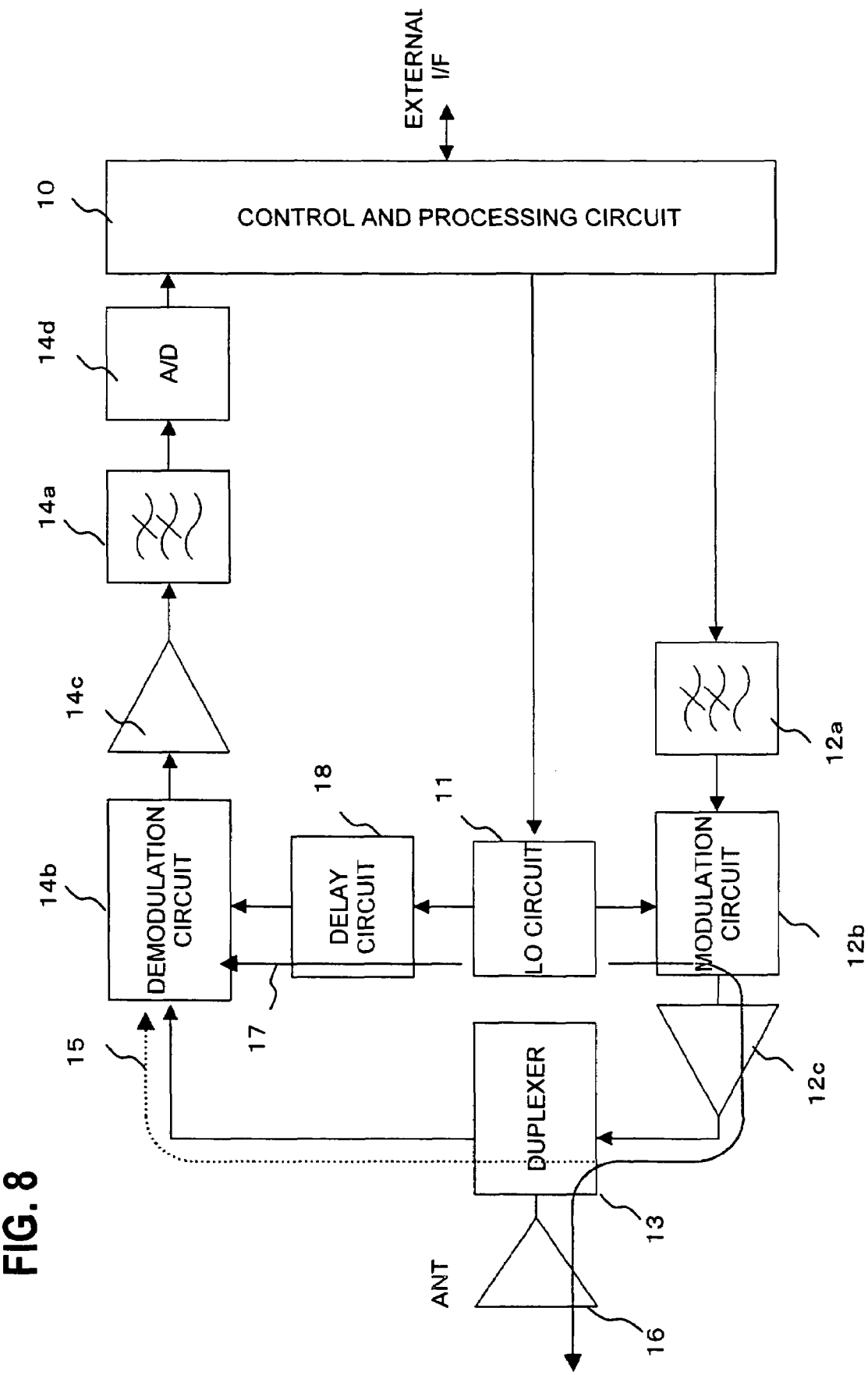
FIG. 8 is a block diagram of a first embodiment of an RFID transceiver device according to the present invention.

FIG. 8 is a block diagram of a first embodiment of an RFID transceiver device according to the present invention. In comparison with the prior art configuration shown in FIG. 5, a characteristic feature of this embodiment is the provision of a delay circuit 18 between the local oscillation circuit 11 and demodulation circuit 14b.

In FIG. 8, a phase difference is produced because the path of the leakage signal 15 whereby the transmission signal that is transmitted through the modulation circuit 12b and power amplifier 12c from the local oscillation circuit 11 leaks from the duplexer 13 to the demodulation circuit 14b is longer than the path of the local oscillation signal 17 that is directly supplied to the demodulation circuit 14b from the local oscillation circuit 11.

Figure 7:
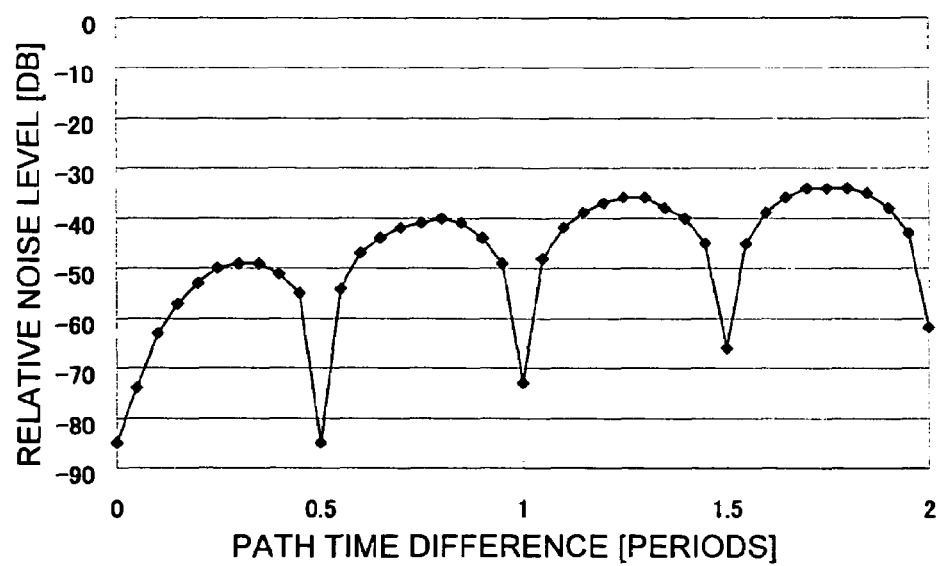
FIG. 7 is a graph showing the relationship between the path time difference and the noise level (relative value)

Consequently, a characteristic feature in FIG. 8 is that the path of the leakage signal 15 is equalized by using a delay circuit 18 to provide a delay on the path of the local oscillation signal 17 that is directly supplied to the demodulation circuit 14b from the local oscillation circuit 11. In this way, as shown in FIG. 7, the same situation is produced as when the path difference is "0" and the relative noise level can thus be reduced to a minimum.

Figure 9:
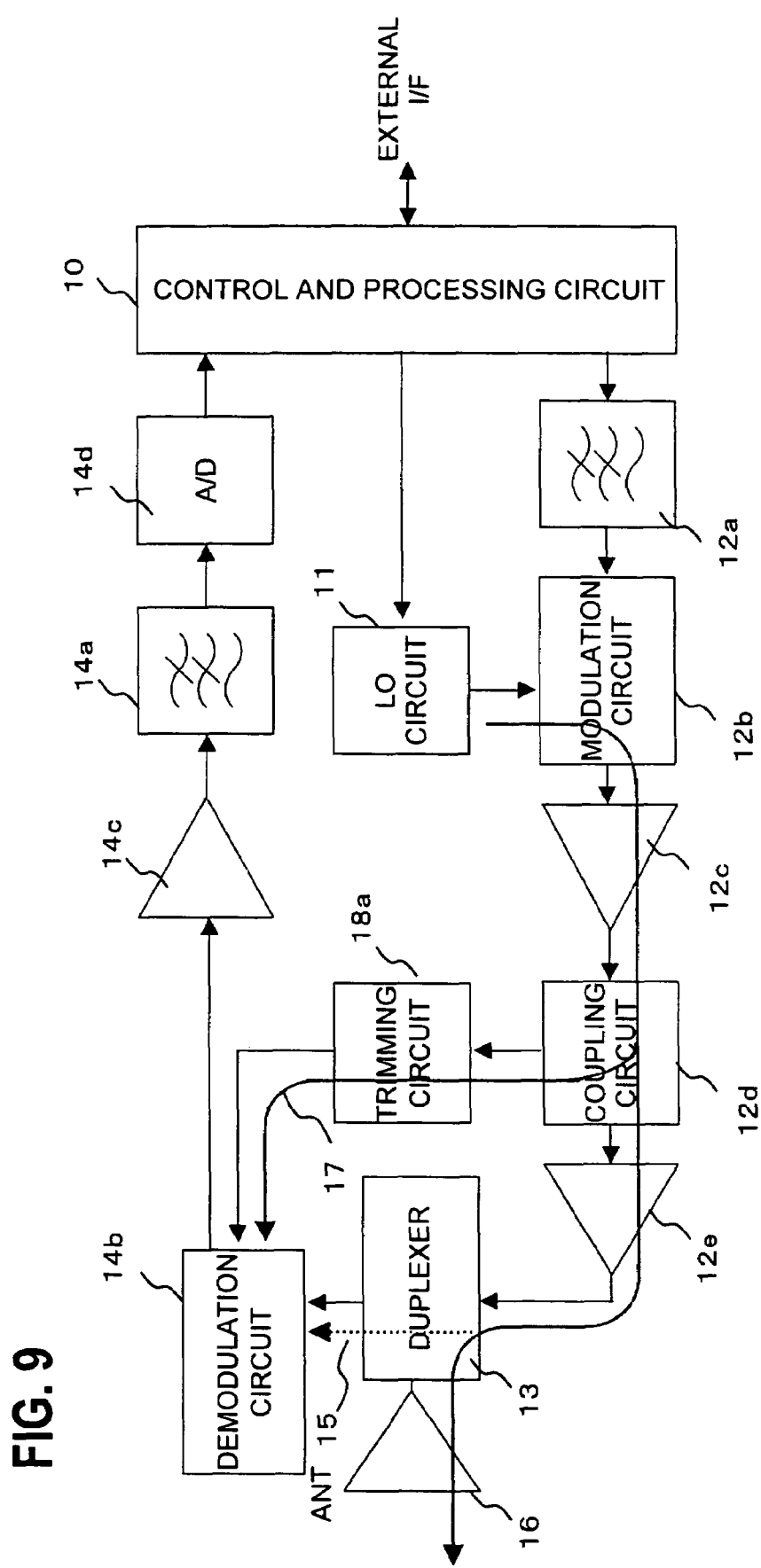
FIG. 9 is a block diagram of a second embodiment of an RFID transceiver device according to the present invention.

FIG. 9 is a block diagram of a second embodiment of an RFID transceiver device according to the present invention. A characteristic feature of the second embodiment is that the circuit configuration is such that the path of the local oscillation signal 17 that is supplied from the local oscillation circuit 11 to the demodulation circuit 14b is substantially equal to the path of the leakage signal 15 from the local oscillation circuit 11 via the duplexer 13.

Specifically, instead of supplying the local oscillation signal directly from the local oscillation circuit 11 to the demodulation circuit 14b, a coupling circuit 12d is provided downstream of the power amplifier 12c so as to reduce the difference with regard to the path of the local oscillation signal 17 supplied to the demodulation circuit 14b and the leakage signal 15 via the duplexer 13. Additionally, the amount of delay corresponding to the minute difference of the existing paths is adjusted by providing a trimming circuit 18 between the coupling circuit 12d and the trimming circuit 14b.

Thus, in the embodiment of FIG. 9 also, phase noise can be reduced since the paths of the local oscillation signal 17 supplied to the demodulation circuit 14b and of the leakage signal 15 via the duplexer 13 can be made substantially the same.

Figure 10:
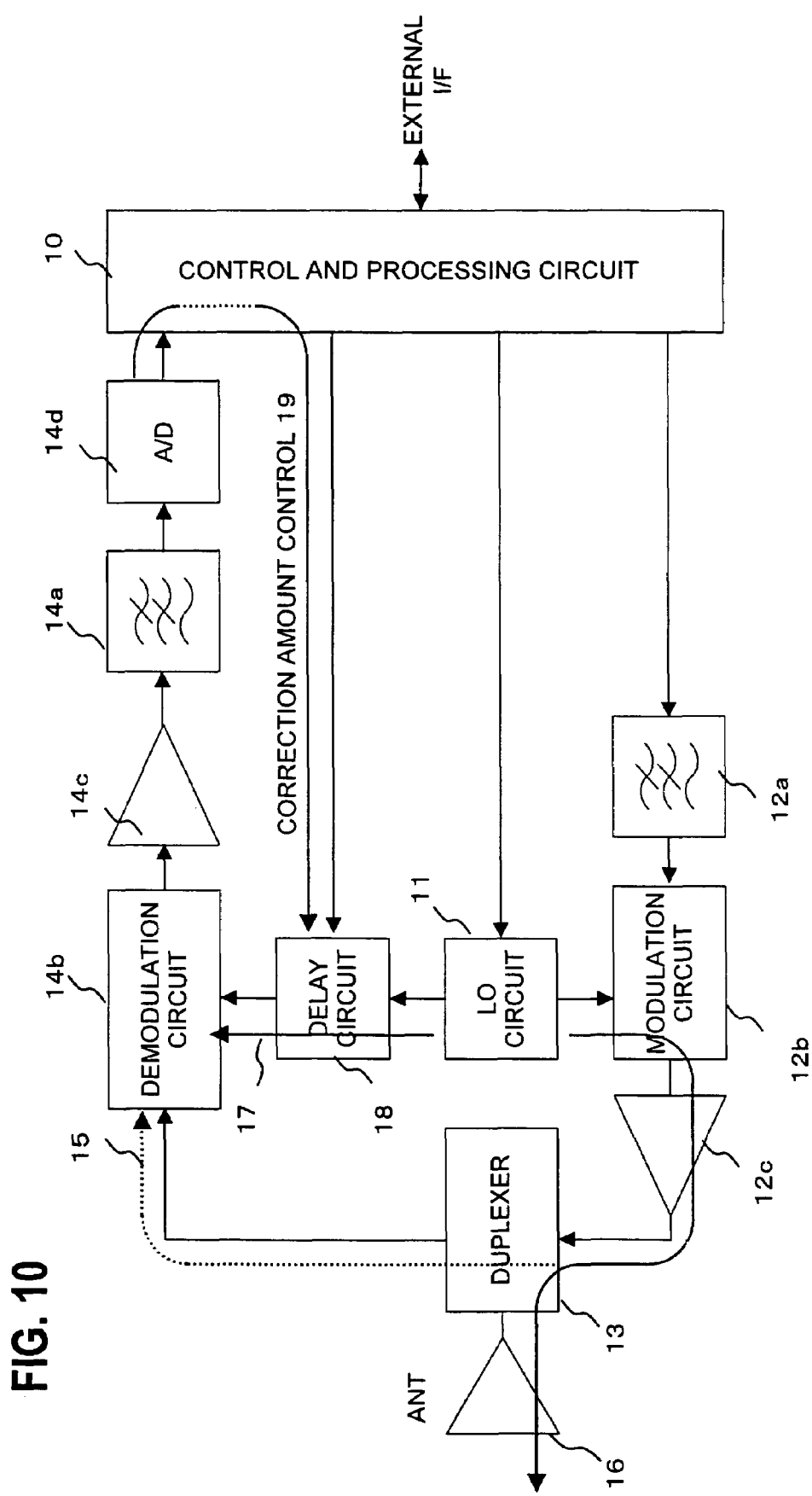
FIG. 10 is a block diagram of a third embodiment of an RFID transceiver device according to the present invention.

FIG. 10 shows a third embodiment. A characteristic feature of this embodiment is that the amount of delay of the delay circuit 18 in the first embodiment of FIG. 8 can be suitably controlled in accordance with the noise level that is received and detected.

Specifically, the output of the demodulation circuit 14b is input to an A/D converter 14d through an amplifier 14c and low-pass filter 14 to be converted to a digital signal. The digital output of the A/D converter 14d is input to the control and processing circuit 10, which evaluates the noise level.

The control and processing circuit 10 supplies a correction amount control signal 19 depending on the noise level to the delay circuit 18 so as to provide a corresponding amount of delay. In this way it is possible to control the delay amount appropriately in accordance with the noise level. The control and processing circuit 10 may be configured with a supplement of a correspondence table between the correction level and correction amount control signal in order to perform such control.

Figure 11:
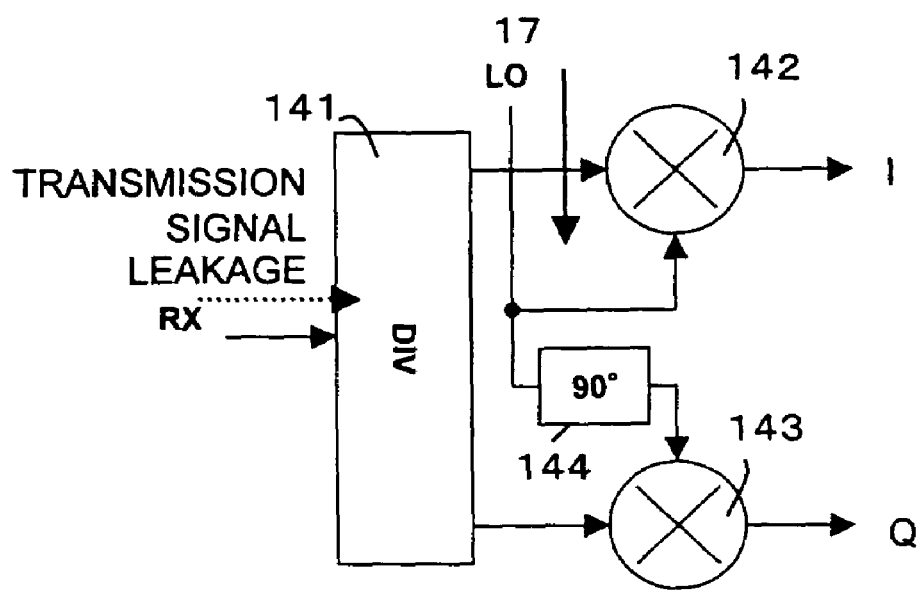
FIG. 11 is a schematic diagram of the demodulation circuit 14b in FIG. 10.
Figure 12:
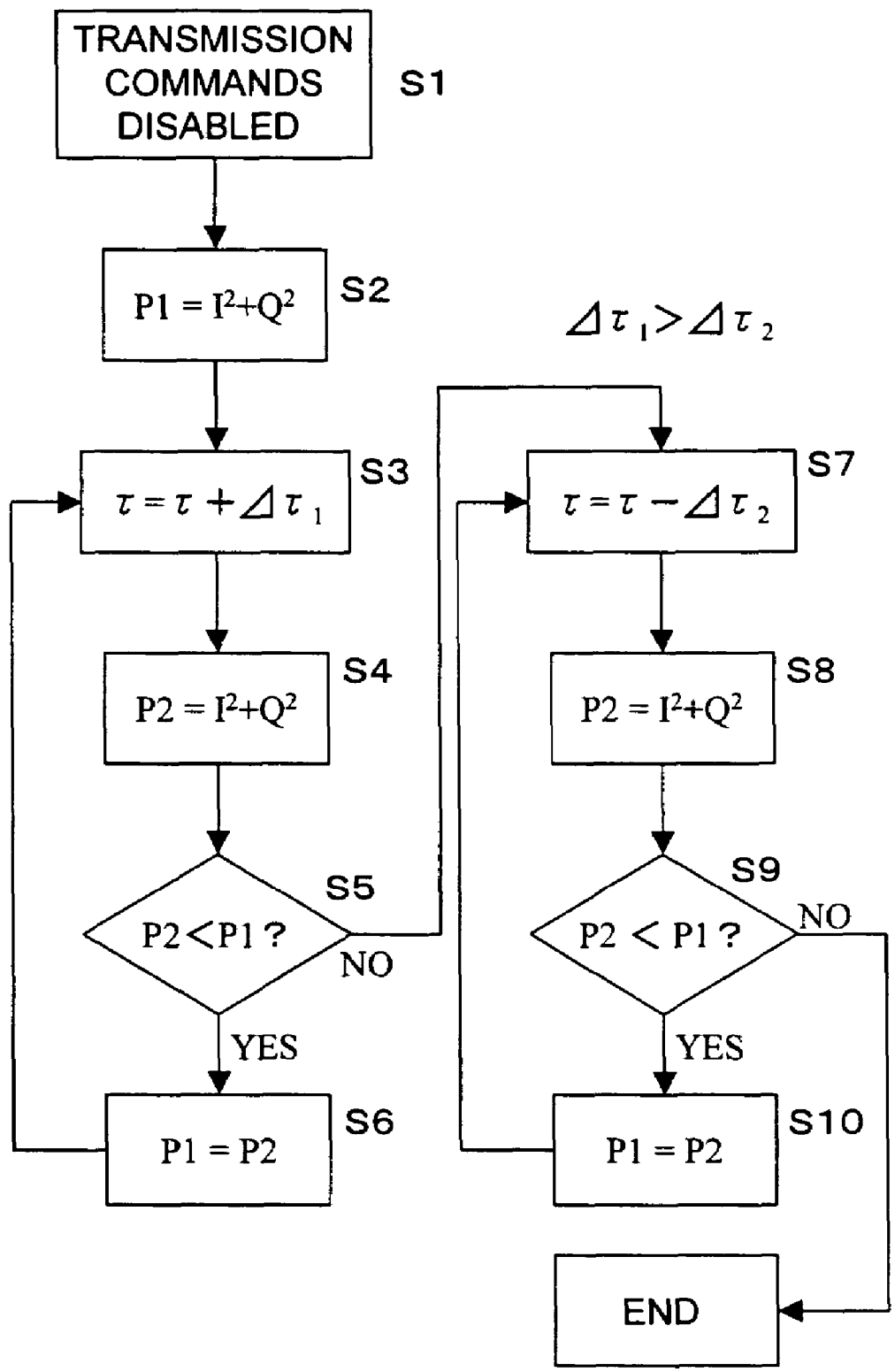
FIG. 12 shows the processing flow in respect of the delay circuit 18 of the control and processing circuit 10 in the case where a demodulation circuit according to FIG. 11 is employed.

FIG. 11 is an example of the configuration of the demodulation circuit 14b in FIG. 10. FIG. 12 shows the processing flow in respect of the delay circuit 18 of the control and processing circuit 10 when the demodulation circuit of FIG. 11 is employed. Also, FIG. 13 is a view given in explanation of the delay amount control in the delay circuit 18.

We shall now return to the description of FIG. 11. The demodulation circuit 14b comprises a quadrature separation circuit 141 that separates the reception signal RX into a mutually orthogonal I channel signal and Q channel signal, a multiplier 142 that multiplies the I channel signal and the local oscillation signal (LO) 17 that is output from the local oscillation circuit 11, and a multiplier 143 that multiplies the Q channel signal by the local oscillation signal that is output from the local oscillation circuit 11 and the phase of which is shifted by 90° through the phase shifter 144.

In FIG. 12, when the amount of delay of the delay circuit 18 is set by performing calibration, this is performed (step S1) in a condition with transmission of commands from the RFID transmission device to the IC tag disabled. The control and processing circuit 10 finds (step S2) the initial power P1

($=I^2+Q^2$) of the demodulation circuit output by inputting the I and Q channel demodulation signals that are output from the demodulation circuit 14b.

When calibration of the delay circuit 18 is performed as described above, the power ($I^2+Q^2$) is thus found in a condition in which transmission of commands from the RFID transmission device to the IC tag is disabled and therefore corresponds to the noise level resulting from the path difference.

Next, the delay amount τ of the delay circuit 18 is increased by Δτ1 (step S3). The output power P2 ($=I^2+Q^2$) of the demodulation circuit 14b at this point is then found (step S4). The power P2 when this delay amount τ is increased by Δτ1 and the initial power P1 are then compared (step S5). In this power comparison, if P2<P1 (Yes in step S5), as the path of the local oscillation signal (LO) 17 that is directly input to the demodulation circuit 14b becomes larger, its difference from the path of the leakage component that arrives via the duplexer 13 becomes smaller, indicating that the noise level becomes smaller.

Figure 13A:
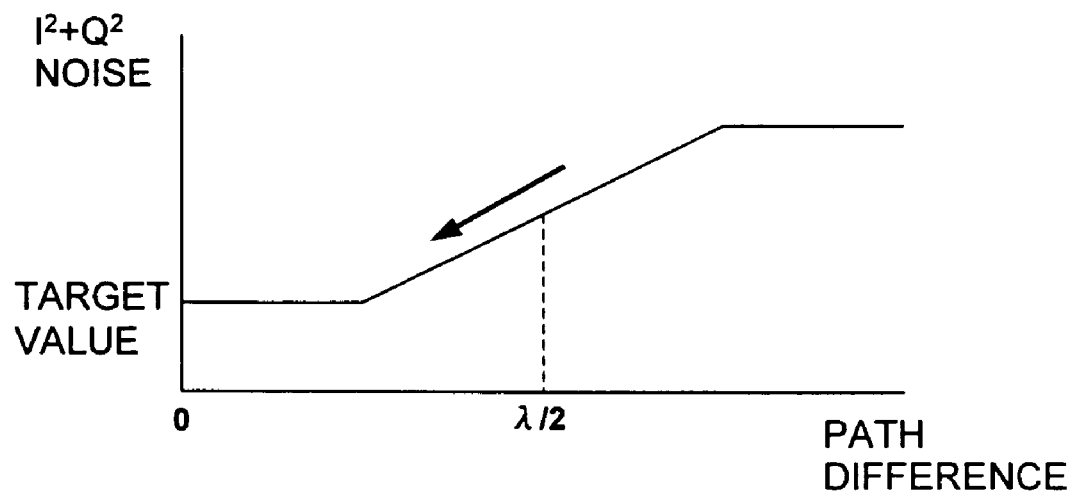
FIGS. 13A and 13B are a view given in explanation of control of the amount of delay in the delay circuit 18.

FIG. 13 shows the relationship between this path difference and noise level. In addition, FIG. 13A shows the characteristic whereby the noise level increases or decreases centered on the point corresponding to a phase difference λ/2 of the path difference; in this figure, the target value for feedback control is a minimum noise level.

Figure 13B:
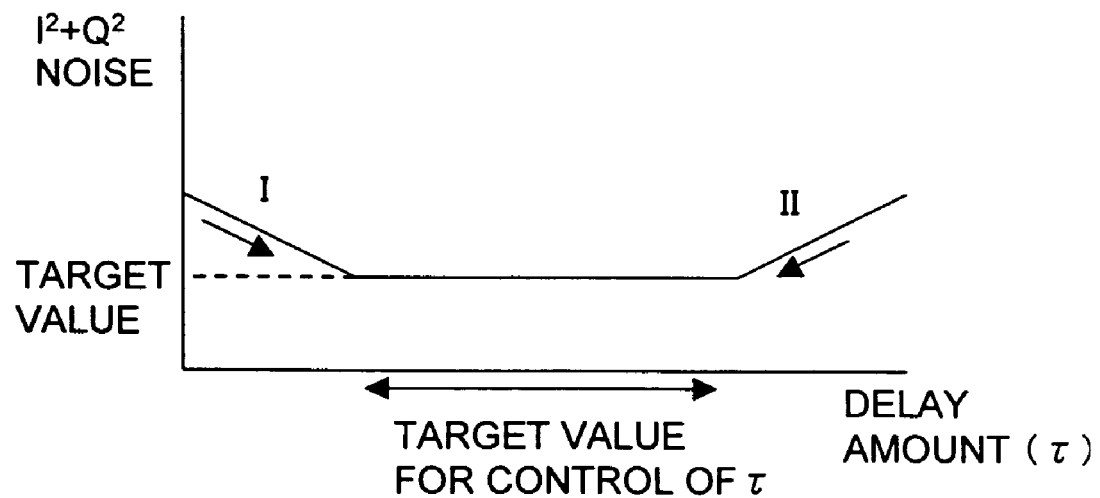

FIG. 13B represents the path difference of FIG. 13A extended in the positive and negative directions and shows the direction of control towards the target value at which the noise level is a minimum, when the amount of delay of the delay circuit 18 is controlled in a range in which the path difference is smaller than the path difference corresponding to a phase difference λ/2.

It can be understood that, in the step S5 referred to above, P2<P1 corresponds for example to the direction I of control in FIG. 13B.

Furthermore, returning to FIG. 12, if P2<P1 (Yes in step S5), P1=P2 is set (step S6) and processing returns to step S3, in which a further delay amount Δτ1 is additionally set; the processing of step S4 and the subsequent steps is then continued.

In contrast, if, in step S5, P2>P1 (No in step S5), the delay amount τ is set (step S7) in the direction such as to be reduced by an amount Δτ2 (<Δτ1). Next, the power P2 ($=I^2+Q^2$) of the demodulation circuit output at this point is found (step S8). The power P2 when this delay amount τ is reduced by Δτ2 and the initial power P1 are compared (step S9).

In this power comparison, if P2<P1 (Yes in step S9), as the direct path from the local oscillation circuit 11 to the demodulation circuit 14b becomes smaller, its difference from the path of the leakage component 15 through the duplexer 13 becomes smaller, showing that the noise level decreases. This corresponds to the direction II of control in FIG. 13B described above.

Consequently, in order to achieve convergence to the target value, P1 is substituted by P2 (step S10) and, returning to step S7, the delay amount is further reduced by Δτ2, and the processing of step S7 and the subsequent steps is continued with.

Figure 14:
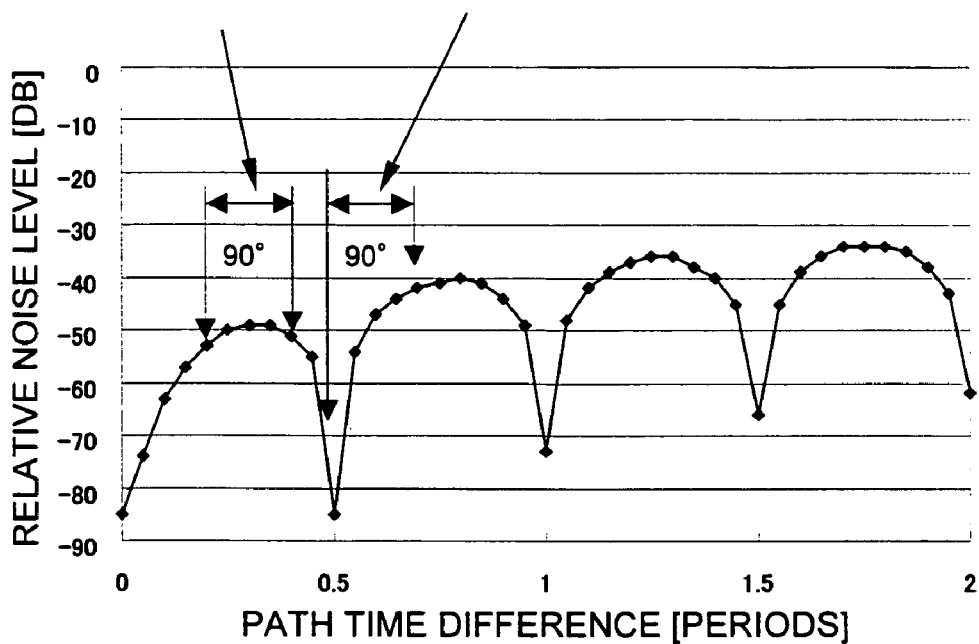
FIG. 14 is a view given in further explanation of the path time difference and the noise level (relative value) illustrated in FIG. 7.

The control range (see FIG. 13A) of the above path difference will now be examined. In the case of quadrature modulation, as shown in FIG. 11, setting to the optimum value must be performed by the combination of the I and Q channels. FIG. 14 is a view given in further explanation of the path time difference and the noise level (relative value) illustrated in FIG. 7; since the I channel and the Q channel have a 90° phase difference, if optimization is effected in respect of one channel, the noise level of the other channel becomes larger.

For example, in FIG. 14, even if the I channel is set to −85 dB, since the Q channel has a phase difference of 90° with respect to the I channel, its noise level becomes larger, at −40 dB (see FIG. 14, A). Consequently, control is performed such as to achieve an optimum value in regard to the combination of I and Q (see FIG. 14, B).

Figure 15:
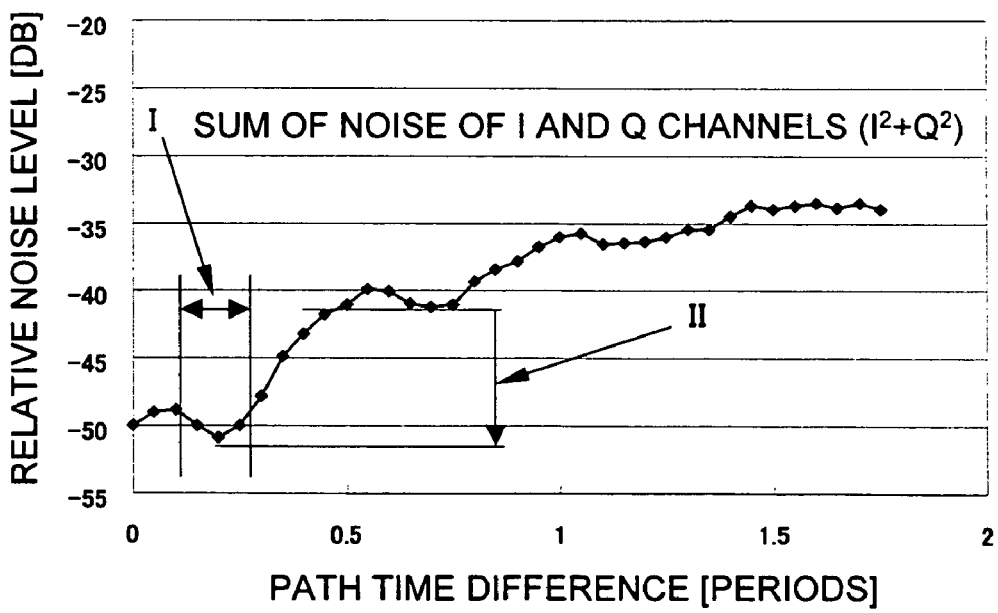
FIG. 15 is a graph found for the path time difference and noise level (relative value), for the sum ($I^2+Q^2$) of the noise of the I and Q channels.

FIG. 15 is a graph in which the path time difference and the noise level (relative value) are found in respect of the sum ($I^2+Q^2$) of the noise of the I and Q channels. In FIG. 15, when for example the path time difference is 0.5 (path difference λ/2), and an improvement in the noise level of 10 dB can be achieved by correcting the path time difference to 0.2 (path difference λ/5) by controlling the amount of delay of the delay circuit 18 (see FIG. 15, II→I).

Figure 16:
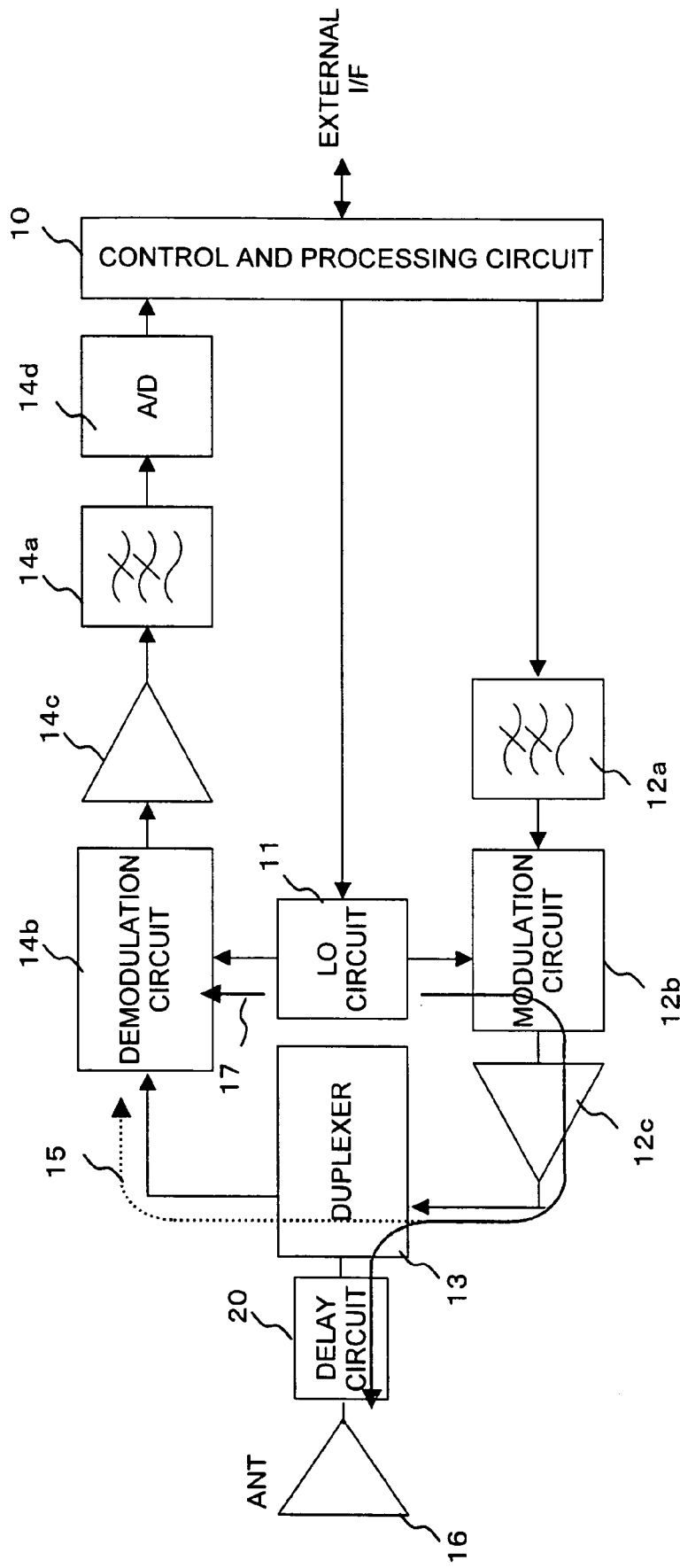
FIG. 16 is a view showing yet a further embodiment of the present invention.

Next, FIG. 16 is a view showing a further embodiment of the present invention. A characteristic feature of this embodiment is that a delay circuit 20 is provided between the duplexer 13 and the power feed terminal of the antenna 16. In this case, the port allocation of the duplexer is such that the TX terminal communicates with the ANT terminal i.e. TX terminal→ANT terminal, but the TX terminal→RX terminal is blocked, and coupling is effected from the ANT terminal→RX terminal.

Figure 17:
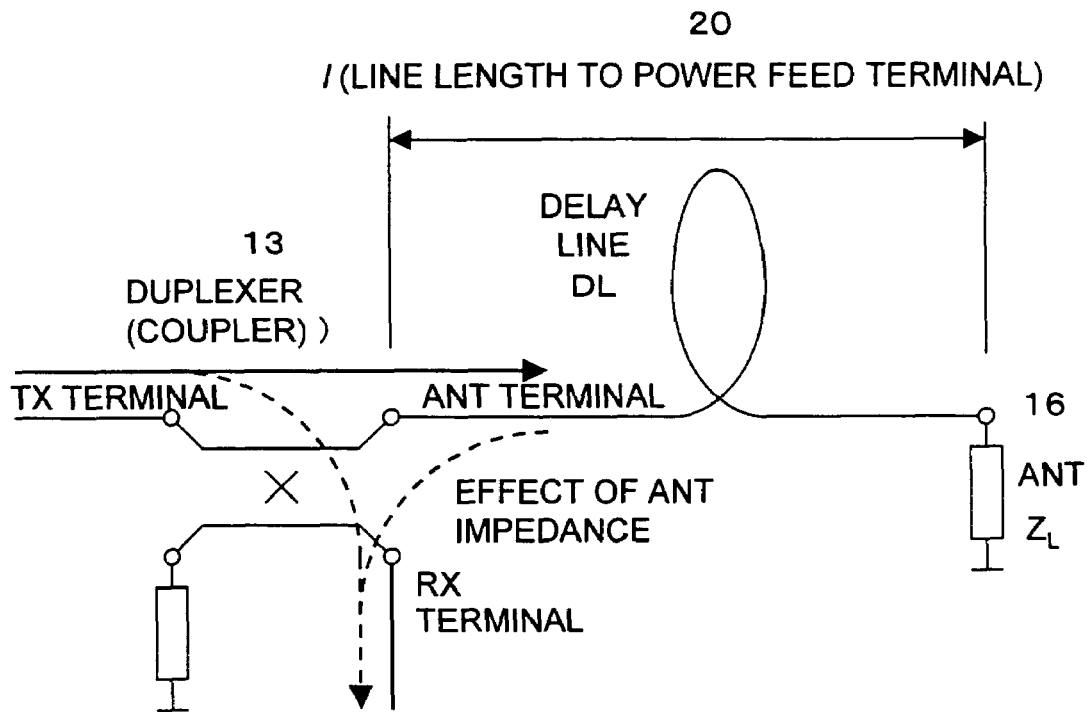
FIG. 17 is an embodiment of the delay circuit 20.

In this embodiment, as shown in FIG. 17, the delay circuit 20 comprises a delay line DL of line length l arranged between the duplexer 13 and the antenna (load $Z_L$ in the Figure). The line length l between the antenna 16 and the duplexer 13 can be adjusted by means of this delay line DL.

The impedance Z of the antenna seen from the duplexer, for a line length l, antenna load impedance $Z_L$ and line characteristic impedance $Z_0$ is as follows.

$$Z = Z_0 \frac{Z_L \cos\beta l + Z_0 \sin\beta l}{Z_0 \cos\beta l + Z_L \sin\beta l}$$

Figure 18:
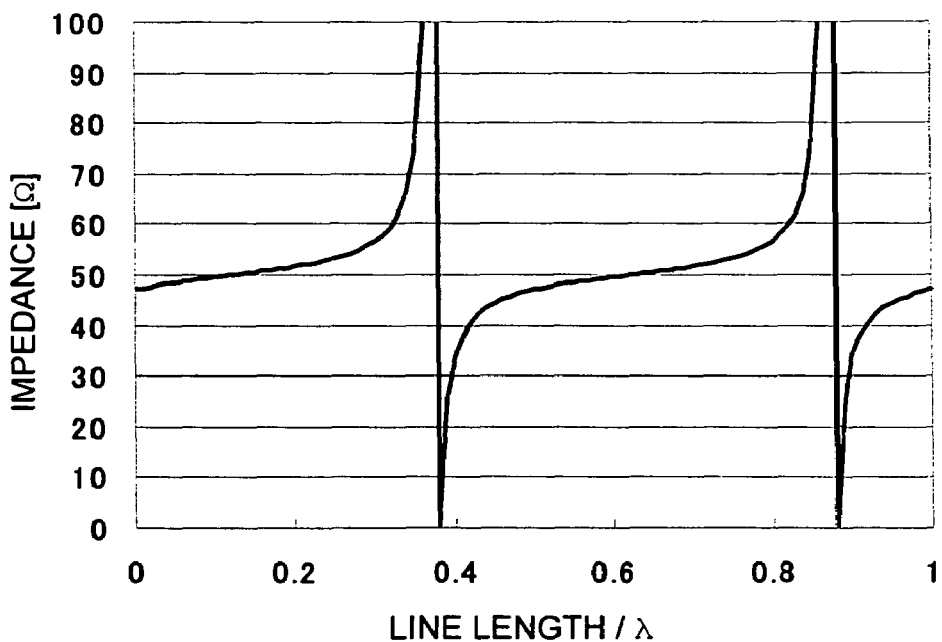
FIG. 18 is a graph showing the relationship between the antenna impedance Z and line length l.

FIG. 18 is a graph showing the relationship between the impedance Z of the antenna seen from the duplexer in FIG. 17 and line length l. The line length is normalized in terms of the wavelength λ and the impedance Z is calculated assuming $Z_0=50\,\Omega$, $Z_L=47\,\Omega$. It can be understood from FIG. 18 that the antenna terminal impedance Z can be varied by varying the line length l.

On the other hand, the amount of the leakage of the transmission signal changes depending on the antenna impedance Z. Consequently, the amount of leakage can be controlled by adjusting the line length l to the power feed terminal by means for example of a delay line DL inserted as a delay circuit 20. The degree of coupling of the duplexer 13 (transmission (TX) terminal→reception (RX) terminal) therefore theoretically becomes infinitely small (0) if the antenna terminal impedance coincides with the characteristic impedance $Z_0$. However, in an actual circuit, the limit is about −40 dB.

Thus, in this embodiment of the present invention, the amount of the leakage of the transmission signal to the demodulation circuit can be reduced by providing a delay circuit 20 and adjusting the line length of the delay circuit 20 so as to make the impedance Z of the antenna seen from the duplexer approach more closely to the characteristic impedance.

Figure 3:
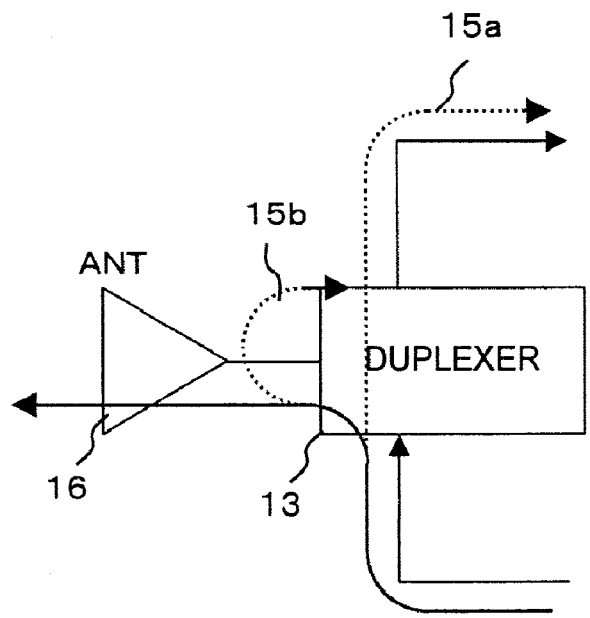
FIG. 3 is a view given in explanation of the leakage component of the transmission signal and reflection at the antenna power feed terminal.
Figure 4:
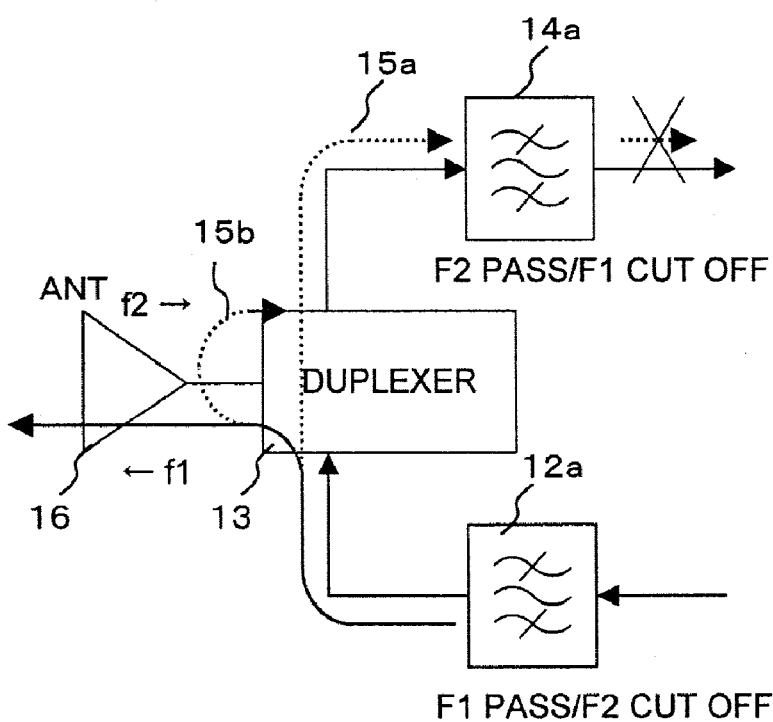
FIG. 4 is a view given in explanation of the leakage component of the transmission signal and reflection at the antenna power feed terminal in the case where the up and down frequencies are different.
Figure 5:
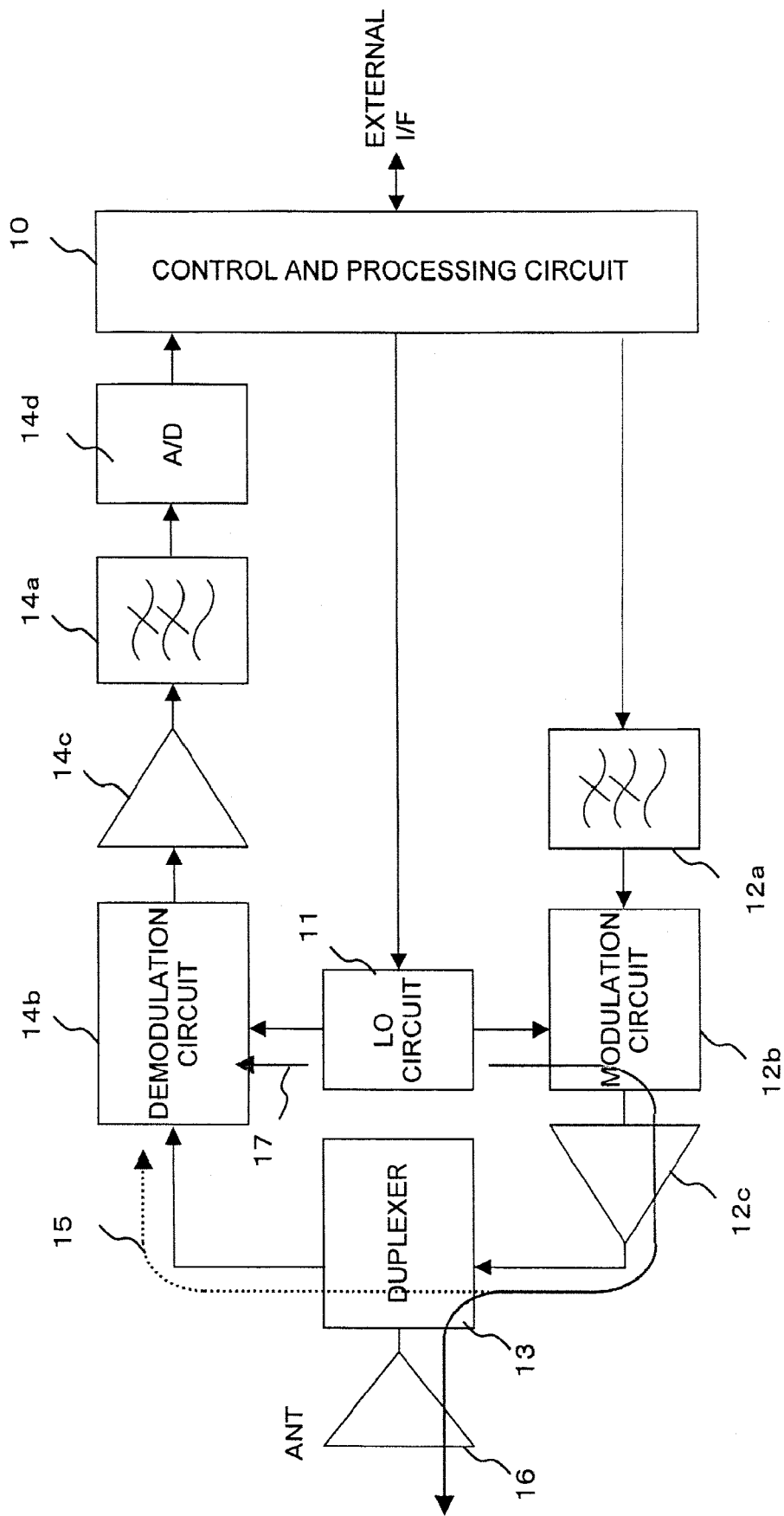
FIG. 5 is a view showing a specific example of the configuration of a transmission circuit and a reception circuit of the RFID transceiver device 1 shown in FIG. 2.
Figure 6:
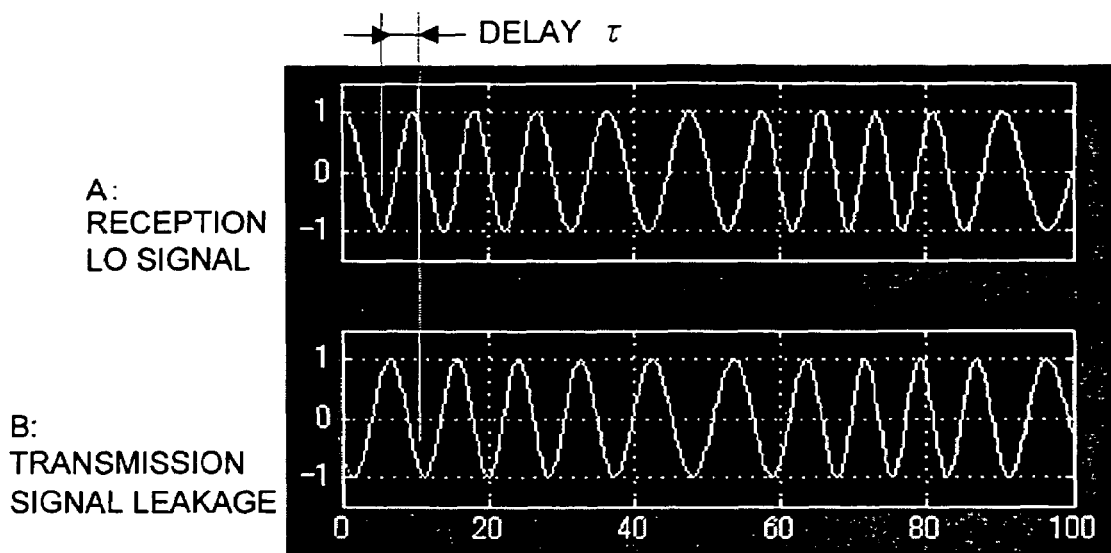
FIG. 6 is a view showing the input signal of the demodulation circuit constituting the reception circuit.

It should be noted that the configuration in which a delay circuit 20 is provided between the transceiving antenna 16 and duplexer 13 in FIG. 16 can also be applied in the embodiments of FIG. 5, FIG. 8 and FIG. 9 described above.

Figure 19:
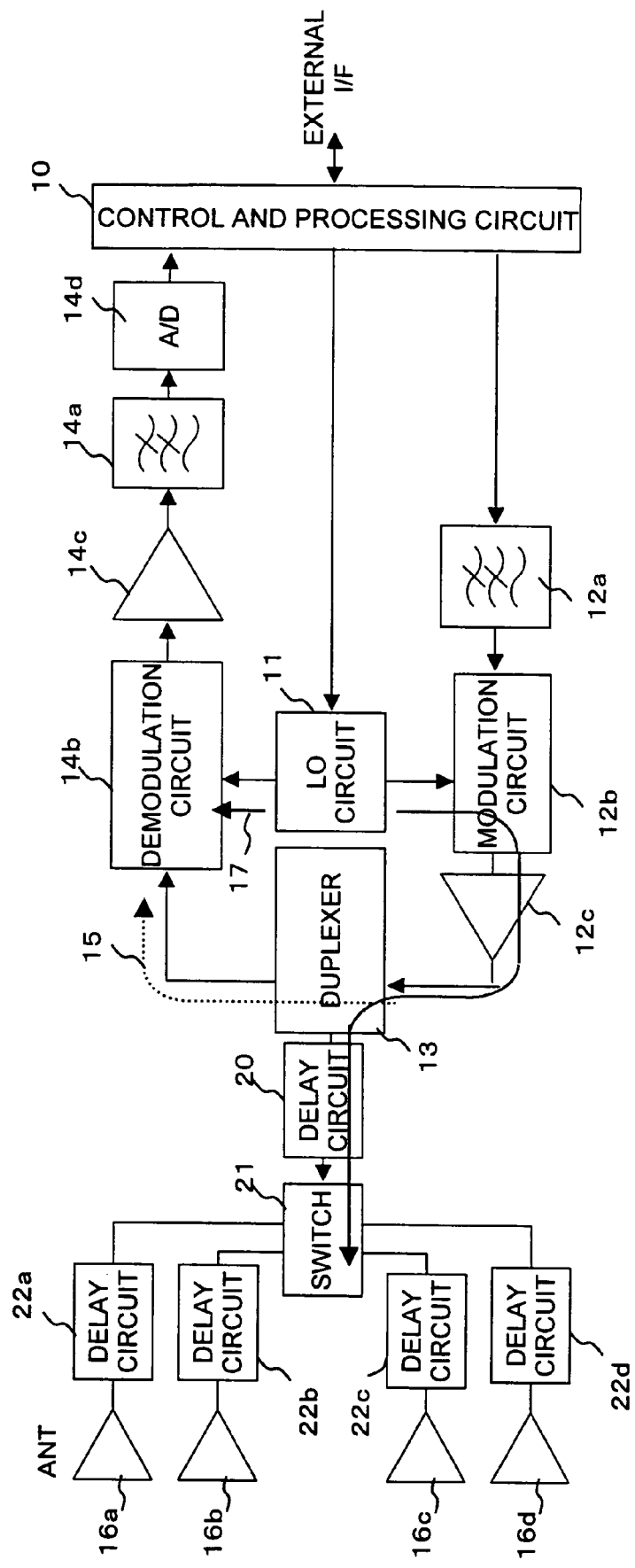
FIG. 19 is an example extending the embodiment of FIG. 16.

FIG. 19 is an example extending the embodiment of FIG. 16. When a common RFID transceiver device is employed with a plurality of IC tags, connection is changed over between a plurality of antennas 16*a* to 16*d* using a switch 21.

The principles of the embodiment of FIG. 16 can be applied in this embodiment also. Specifically, delay circuits 22*a* to 22*d* are inserted between the switch 21 and the antennas 16*a* to 16*d*.

The leakage of the transmission signal to the demodulation circuit 14*b* can be minimized by making the corresponding antenna terminal impedance approach the characteristic impedance by adjusting the line lengths in the respective delay circuits 22*a* to 22*d*.

As described above with reference to the drawings, according to the present invention, an RFID transceiver device is provided that is capable of high sensitivity reception, by the reduction of noise, irrespective of the distance to the tag. This makes it possible to configure an RFID system of high reliability.

What is claimed is:

1. An RFID transceiver device comprising:
   a local oscillation circuit that generates a local oscillation signal;
      a demodulation circuit that demodulates a reception signal using the frequency of the local oscillation signal output from said local oscillation circuit;
      a transmission circuit that modulates, amplifies and transmits a local oscillation signal output from said local oscillation circuit;
      a duplexer that supplies to a transceiving antenna the transmission signal from said transmission circuit and branches the reception signal received by said transceiving antenna to said demodulation circuit; and
      a delay circuit between said local oscillation circuit and said demodulation circuit, wherein
         the amount of delay of said delay circuit is set to a magnitude corresponding to the path difference between the path of the leakage, via said duplexer into said demodulation circuit, of the transmission signal that is output from said local oscillation circuit for transmission, and the path of direct input of the local oscillation signal from said local oscillation circuit to said demodulation circuit.

2. The RFID transceiver device according to claim 1, further comprising a control and processing circuit that detects noise level in accordance with the output of said demodulation circuit, wherein said control and processing circuit controls the delay amount of said delay circuit on the basis of said detected noise level.

3. An RFID transceiver device comprising:
   a local oscillation circuit that generates a local oscillation signal;
   a demodulation circuit that demodulates a reception signal using the frequency of the local oscillation signal output from said local oscillation circuit;
   a modulation circuit that modulates the local oscillation signal output from said local oscillation circuit;
   a duplexer that supplies to a transceiving antenna the transmission signal output from said modulation circuit and branches the reception signal received by said transceiving antenna to said demodulation circuit; and
   a path for supplying the transmission signal output from said modulation circuit as the local oscillation signal to said demodulation circuit, wherein the amount of delay on said path and the amount of delay on the path of the leakage of the transmitted carrier signal that is input to said demodulation circuit through said duplexer are set to the same magnitude.

4. The RFID transceiver device according to any of claim 1 further comprising:
   a transceiving antenna; and
   a delay circuit that connects said transceiving antenna to said duplexer, wherein the amount of delay of the delay circuit is set such that the impedance of said transceiving antenna seen from said duplexer is substantially equal to the characteristic impedance.

5. The RFID transceiver device according to claim 2, wherein
   detection of the noise level in said performed in a condition in which command transmission from said transmission circuit to the tag is halted.

* * * * *

UNITED STATES PATENT AND TRADEMARK OFFICE
CERTIFICATE OF CORRECTION

PATENT NO. : 7,492,812 B2 Page 1 of 1
APPLICATION NO. : 11/209627
DATED : February 17, 2009
INVENTOR(S) : Teruhisa Ninomiya et al.

It is certified that error appears in the above-identified patent and that said Letters Patent is hereby corrected as shown below:

On the title page, item (73) Assignee, replace "Fujitsu Limited, Kawasaki (JP)" with --Fujitsu Limited, Kawasaki (JP); Fujitsu Frontech Limited, Tokyo (JP)--

Signed and Sealed this

Third Day of August, 2010

David J. Kappos
*Director of the United States Patent and Trademark Office*